Feb. 10, 1953    W. W. WATTS    2,628,039

TAPE-REELING SYSTEM

Filed April 21, 1949

INVENTOR
W. WALTER WATTS
BY Morris B. Rabkin
ATTORNEY

Patented Feb. 10, 1953 2,628,039

UNITED STATES PATENT OFFICE 2,628,039

TAPE-REELING SYSTEM

William Walter Watts, Wynnewood, Pa., assignor to Radio Corporation of America, a corporation of Delaware Application April 21, 1949, Serial No. 88,745

5 Claims. (Cl. 242—76)

This invention relates to improvements in tape-reeling systems and, though not limited thereto, will be described as applied to a reeling system for a recording-phonograph of the type employing magnetizable tape-like records.

One problem encountered in the operation of magnetic-tape phonographs is that of "threading" the tape through the spaces between the guide members and transducers of the machine prior to a recording or reproducing interval. The usual practice is to pass the leading end of the tape between the several guide members and around the capstan of the reeling system and then to secure the said end to the take-up reel. Alternatively, when the guide members and capstan are supported at but one end, the tape may first be secured to the take-up reel and a looped portion of the tape then inserted edgewise between adjacent ones of the guide members and around the capstan. In either event, the "threading" operation has heretofore been a time-consuming and troublesome one, since considerable care and dexterity had to be exercised in inserting the tape in the exact relative position, with respect to the several guide members, which it must assume during its run between reels.

Accordingly, the principal object of the present invention is to provide a tape-reeling system wherein the tape may be set-up or "threaded" with ease and dispatch and without observation or even the knowledge of the operator as to the precise path in which the record is to run in its journey between reels.

Stated generally, the foregoing and other objects are achieved in accordance with the invention by the provision of an "open-sided" reeling system (i. e., one wherein the guide rods, or rollers, and the capstan are supported at but one end) having an auxiliary guide member or "finger" over the free end of which the tape may be looped and then drawn edgewise through the open side of the system simply by turning the take-up reel to which the leading end of the tape is secured.

Figure 1:
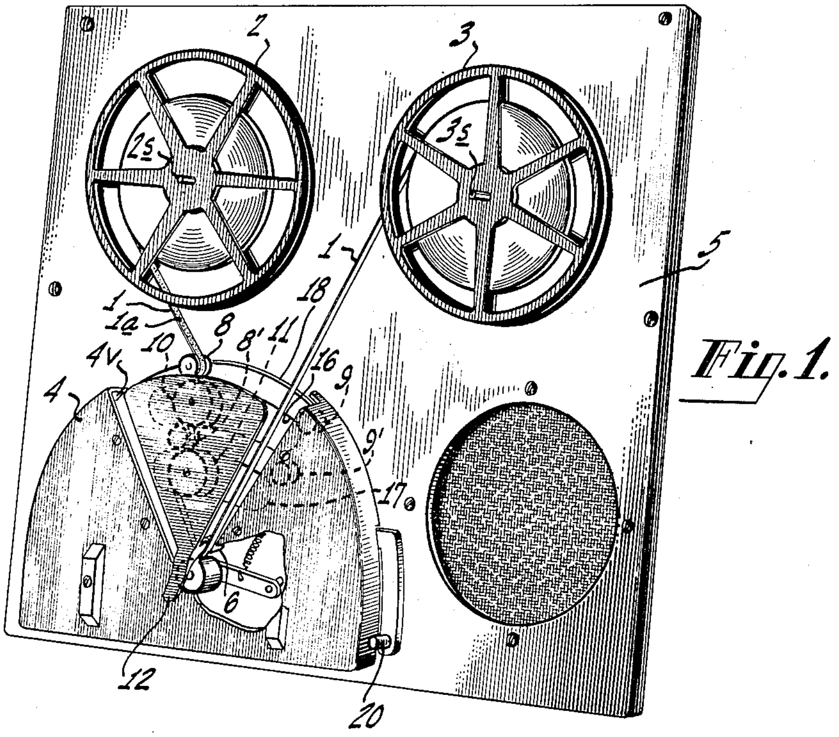
Fig. 1 is a view in perspective of a magnetic-tape phonograph having a tape-reeling system embodying the present invention.

The recording phonograph shown in the drawing employs a paper (or "plastic") tape record 1 coated on one side with a layer 1*a* of powdered iron or other magnetizable material. The tape is wound to run, in either direction, between a storage reel 2 and a take-up reel 3 in a substantially triangular or V-shape path, a portion of which is shown enclosed in a housing 4 secured to the front surface of the panel 5 from which the spindles 2*s* and 3*s* of the reels project. The panel 5 may be mounted either horizontally or vertically, in which latter case it may be given a slight rearward tilt, as shown in Fig. 1.

As will hereinafter more fully appear, the housing 4 contains a capstan 6, through which a reeling force is applied to the tape 1, a retractable pressure roller 7 which normally bears against the tape on the capstan, and a number of guide rods 8, 8'; 9, 9', disposed on opposite sides of the capstan in a pattern such that they define a substantially V-shape path within which two magnetic transducers 10 and 11 for the magnetizable surface of the tape are mounted. The capstan, which is at the apex of the V, and the guide members which define the arms of the V, are supported only at their inner ends and thus may be said to define an "open-sided" path for the record tape. In order to permit the tape to be entered edgewise into the said path, the housing 4 is provided with a V-shape slot or opening 4V which communicates with the said path and is in register therewith, at least when the guide members 8, 9, etc. are in their later-described "idle" position.

Figures 2, 3, 4:
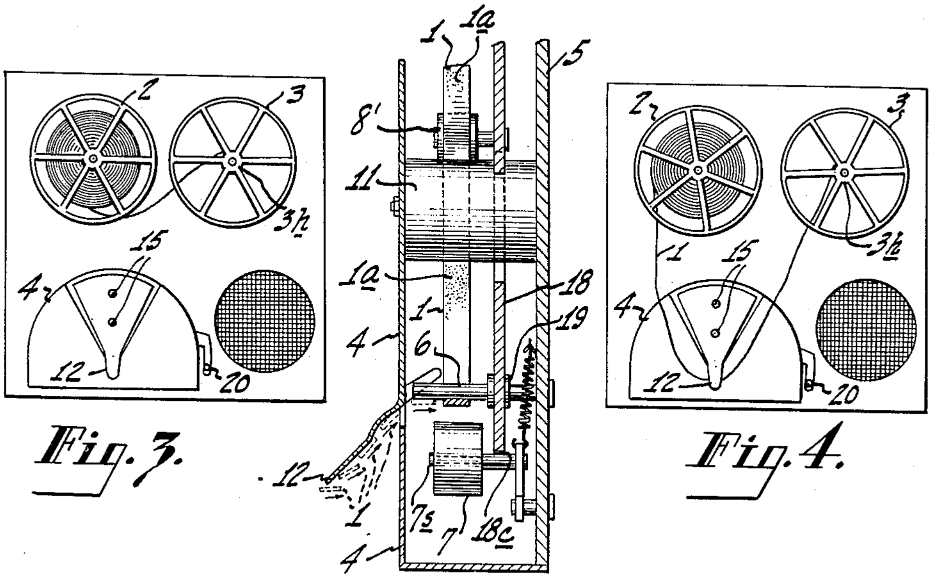
Fig. 2 is a sectional view taken on the line 2—2 of Fig. 3 but with the pressure roller retracted to permit the tape to be entered between the said roller and the capstan of the system.
Fig. 3 is a front elevation, on a reduced scale, of the device of Fig. 1 with the tape connected between the reels prior to being installed or threaded in the reeling system.
Fig. 4 is a view similar to Fig. 3 but with the tape looped about a guide element prior to being drawn edgewise into its reeling position in the system.

For the purpose of facilitating the entry of the tape into its open-sided path, for its run past the transducers 10 and 11, the housing 4 is provided with an outwardly extending, downwardly inclined, projection or "finger" 12 which extends across the apex of the V-shape slot or opening 4V, adjacent to the open or unsupported side or end of the capstan 6 (see Figs. 1 and 2). The manner in which the finger 12 operates to guide the tape into its path will be manifest upon inspection of Figs. 2, 3 and 4.

As shown in Fig. 3, the first step in setting-up the tape 1 for its recording or reproducing "runs" is to take the free end of the tape, which has previously been wound upon the storage reel 2, and attach it to the hub 3*h* of the take-up reel 3. As shown in Fig. 4, the next step is to unreel some of the tape on the storage reel 2, as by exerting a downward pull on the tape between the reels, while holding the take-up reel stationary, and hooking the resulting loop under the free end of the stationary finger 12. Thereafter, upon the application of a reeling force to the take-up reel 3 the tape will slide upwardly and inwardly (as shown by the arrows in Fig. 2) along the inclined under surface of the finger 12 and thence under the free end of the capstan 6 into its normal reeling position.

It is of course desirable that the parts of the tape which form the sides of the pulled-down "loop" fall automatically (i. e., without the assistance of the operator) into the slanted arms of the V-shape slot 4V in the housing 4 during the above described preliminary reeling operation. The automatic entry of the looped part of the tape into the arms of the V-shape slot 4V is ensured by so positioning the said slot (and the movable guide elements with which the slot communicates) that the left arm of the V is tangent to the outermost layer of tape on the storage reel 2 when the tape is completely wound on that reel, and the other or right arm of the V is tangent to the hub of the take-up reel 3.

The particular open-sided reeling system to which the present invention is here applied is similar to the one described and claimed by Masterson and Urquhart in their copending application Serial No. 84,634, filed March 31, 1949. As in the said copending application, the magnetic transducers (here designated 10 and 11), over which the tape runs in its journey from one reel to the other, are of the double-ended type described and claimed in the sole application of Masterson, Serial No. 62,754, filed November 30, 1948.

The double-ended transducers 10 and 11 are immovably mounted (as by non-magnetic screws 15, Figs. 3 and 4, which extend through the front of the housing 4) in spaced relation along a common axis on the vertically arranged panel 5 and project through separate arcuate apertures 16 and 17 in a pivotally mounted plate 18 in front of the panel 5. The capstan or driving pulley 6 for the tape is mounted adjacent to the pivot 19 of the plate 18 and the two pairs 8—9 and 8′—9′ of guide rods or rollers are mounted in spaced-apart relation on different radii of the said plate 18 adjacent to the opposite ends of the slots 16 and 17 through which the transducers 10 and 11 project. The record guide members 8—9 (8′—9′) and the capstan 6 define a path in the form of an open-ended loop or V around which the record 1 travels with its magnetizable surface 1*a* presented to the interior of the V. Thus, when the pivoted front plate 18 is moved to the right under control of a handle 20, as is shown in Fig. 1, the guide members 8 and 8′ urge the tape 1 into contact with the left end of each of the transducers 10 and 11, and the tape is drawn by the capstan 6 over the air-gap between the polar extremities at that end of the transducers. Conversely, when the pivoted support 18 is swung all the way to the left (by lifting the handle 20) the tape is moved out of contact with the left end of the transducers 10 and 11 and is urged by the other pair of guide members 9 and 9′ into contact with the air-gap on the right side of the transducers. As described in the Masterson sole application, the opposite ends of the core of each transducer are offset from each other and serve different longitudinally extending sound-tracks on the magnetizable surface of the tape. In the instant case, the left end of the upper transducer 10 serves as the "erasing head" for one of the sound-tracks when the tape is driven in the forward direction, and its other end surface is the erasing head for the other track when the tape is driven in the opposite direction. Similarly, the left end of the lower transducer 11 serves as a combined recording and reproducing head for the first-mentioned track when the tape is running forward and its other end serves as the recording and reproducing head for the other track when the tape is running in the reverse direction.

In Fig. 1, the guide elements 8—8′ and the pressure roller 7 of the reeling system are shown in their normal operating position; that is to say, the pressure roller 7 is in contact with the tape on the capstan 6, and the pivoted plate 18, on which the guide elements 8—8′ are mounted, has been moved to the right (by pressing down upon the handle 20) so that the said elements have moved the tape into contact with the left end of the transducers 10 and 11. When a tape is to be changed, the plate 18 is moved to its center position, whereby the guide elements are moved beyond the outermost edge of the arms of slot 4V where they are out of contact with the transducers, so that the tape may be entered into the space between the said elements and the transducers. As described and claimed in the Masterson and Urquhart case, and as shown in Fig. 2 of the subject application, the lower extremity of the pivoted plate 18 comprises a cam surface 18 which bears against the shaft 7*s* of the pressure roller 7 and moves the said roller away from the capstan 6 when the plate 18 is moved to its above described central or "idle" position.

It will now be apparent that the present invention provides an improved tape-reeling system and one wherein the tape may be set up or "threaded" with ease and dispatch, even by an unskilled person.

What is claimed is:

1. In a tape-reeling system, a housing containing a plurality of guide members, positioned to define a path along which the tape is to run, said housing containing an opening substantially in register with said path and through which a length of said tape may be entered edgewise into operative relation with said guide members, and a projection on said housing extending across a portion of said opening, said projection having a free-end under which a portion of said tape may be looped and an inclined inner surface along which the looped portion of said tape may be drawn edgewise through said opening into engagement with said guide members upon subjecting said looped tape to a reeling force.

2. The invention as set forth in claim 1 and wherein said guide members are mounted to define a substantially V-shape path for said tape, and wherein the registered opening in said housing is of substantially duplicate contour.

3. The invention as set forth in claim 2 and wherein one of said guide members comprises a capstan for applying a driving force to said tape, and said capstan and said projection are mounted adjacent to the apex of said registered V's.

4. A tape-reeling system comprising, a storage-reel, a take-up reel and a capstan each having an axis of rotation, said axes being parallel and triangularly disposed, a tape-guide member mounted adjacent to said capstan on the exterior of the triangle defined by said axes, said capstan and said guide member having adjacent free ends between which said tape may be entered edgewise into driven relation with respect to said capstan, a projection secured at one of its ends within said triangle and having an inclined surface extending outwardly beyond the end of said capstan and guide member and terminating in a free end under which said tape may be looped and, upon subjecting said tape to a reeling force, drawn along said inclined surface and entered edgewise between said capstan and guide member.

5. A tape-reeling system comprising a storage reel upon which said tape is stored, a take-up reel having a hub to which the leading end of said tape is attached, and a capstan for applying a driving force to said tape, said reels being mounted for rotation about horizontally extending axes in a substantially common plane and said capstan being mounted for rotation about a horizontally extending axis beneath said plane, a plurality of guide members disposed on opposite sides of said capstan in a pattern defining a substantially V-shape path wherein the capstan is located at the apex of the V and the arms of the V lie along lines which are substantially tangent, respectively, to the outermost layer of the tape on said storage reel and the hub of said take-up reel, and a finger-like projection secured at one of its ends within said V and having an inclined surface extending outwardly over and beyond said capstan and terminating in a free end under which said tape may be looped and, upon subjecting said take-up reel to rotation, drawn inwardly along said inclined surface into said V-shape path.

W. WALTER WATTS.

REFERENCES CITED

The following references are of record in the file of this patent:

UNITED STATES PATENTS

| Number | Name | Date |
|---|---|---|
| 1,119,451 | Power | Dec. 1, 1914 |
| 1,548,960 | Stuber | Aug. 11, 1925 |
| 1,645,882 | Stuber | Oct. 18, 1927 |
| 1,782,470 | Heisler | Nov. 25, 1930 |
| 2,438,286 | Huber | Mar. 23, 1948 |
| 2,443,708 | Links | June 22, 1948 |
| 2,473,074 | Reynolds | June 14, 1949 |

FOREIGN PATENTS

| Number | Country | Date |
|---|---|---|
| 24,902 | Australia | Jan. 31, 1930 |
| 246,483 | Switzerland | Oct. 1, 1947 |
| 582,658 | Germany | Mar. 8, 1932 |
| 639,380 | France | June 20, 1928 |